United States Patent
Eickemeyer et al.

(10) Patent No.: US 10,042,647 B2
(45) Date of Patent: Aug. 7, 2018

(54) MANAGING A DIVIDED LOAD REORDER QUEUE

(71) Applicant: International Business Machines Corporation, Armonk, NY (US)

(72) Inventors: Richard J. Eickemeyer, Rochester, MN (US); David A. Hrusecky, Cedar Park, TX (US); Elizabeth A. McGlone, Rochester, MN (US); Brian W. Thompto, Austin, TX (US); Albert J. Van Norstrand, Jr., Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 213 days.

(21) Appl. No.: 15/193,338

(22) Filed: Jun. 27, 2016

(65) Prior Publication Data

US 2017/0371658 A1    Dec. 28, 2017

(51) Int. Cl.
G06F 9/38    (2018.01)

(52) U.S. Cl.
CPC .......... *G06F 9/3855* (2013.01); *G06F 9/3824* (2013.01)

(58) Field of Classification Search
None
See application file for complete search history.

(56) References Cited

U.S. PATENT DOCUMENTS

| | | | |
|---|---|---|---|
| 4,858,113 A | 8/1989 | Saccardi | |
| 5,055,999 A | 10/1991 | Frank et al. | |
| 5,095,424 A | 3/1992 | Woffinden et al. | |
| 5,353,426 A | 10/1994 | Patel et al. | |
| 5,471,593 A | 11/1995 | Branigin | |
| 5,475,856 A | 12/1995 | Kogge | |
| 5,553,305 A | 9/1996 | Gregor et al. | |
| 5,630,149 A | 5/1997 | Bluhm | |
| 5,680,597 A | 10/1997 | Kumar et al. | |
| 5,809,522 A | 9/1998 | Novak et al. | |

(Continued)

FOREIGN PATENT DOCUMENTS

| CN | 101021778 A | 8/2007 |
|---|---|---|
| CN | 101676865 A | 3/2010 |

(Continued)

OTHER PUBLICATIONS

Anonymous, "A Novel Data Prefetch Method Under Heterogeneous Architecture", IP.com Prior Art Database Technical Disclosure No. 000224167 (online), Dec. 2012, 14 pages, URL: http://ip.com/IPCOM/000224167.

(Continued)

*Primary Examiner* — John Lindlof
(74) *Attorney, Agent, or Firm* — Joseph D. Downing; Robert R. Williams; Kennedy Lenart Spraggins LLP

(57) ABSTRACT

Managing a divided load reorder queue including storing load instruction data for a load instruction in an expanded LRQ entry in the LRQ; launching the load instruction from the expanded LRQ entry; determining that the load instruction is in a finished state; moving a subset of the load instruction data from the expanded LRQ entry to a compact LRQ entry in the LRQ, wherein the compact LRQ entry is smaller than the expanded LRQ entry; and removing the load instruction data from the expanded LRQ entry.

20 Claims, 6 Drawing Sheets

(56) References Cited

U.S. PATENT DOCUMENTS

| | | |
|---|---|---|
| 5,809,530 A | 9/1998 | Samra et al. |
| 5,822,602 A | 10/1998 | Thusoo |
| 5,913,048 A | 6/1999 | Cheong et al. |
| 5,996,068 A | 11/1999 | Dwyer, III et al. |
| 6,021,485 A | 2/2000 | Feiste et al. |
| 6,026,478 A | 2/2000 | Dowling |
| 6,044,448 A | 3/2000 | Agrawal et al. |
| 6,073,215 A | 6/2000 | Snyder |
| 6,073,231 A | 6/2000 | Bluhm et al. |
| 6,092,175 A | 7/2000 | Levy et al. |
| 6,098,166 A | 8/2000 | Leibholz et al. |
| 6,112,019 A | 8/2000 | Chamdani et al. |
| 6,119,203 A | 9/2000 | Snyder et al. |
| 6,138,230 A | 10/2000 | Hervin et al. |
| 6,145,054 A | 11/2000 | Mehrotra et al. |
| 6,170,051 B1 | 1/2001 | Dowling |
| 6,269,427 B1 | 1/2001 | Kuttanna et al. |
| 6,212,544 B1 | 4/2001 | Borkenhagen et al. |
| 6,237,081 B1 | 5/2001 | Le et al. |
| 6,286,027 B1 | 9/2001 | Dwyer, III et al. |
| 6,311,261 B1 | 10/2001 | Chamdani et al. |
| 6,336,168 B1 | 1/2002 | Frederick, Jr. et al. |
| 6,336,183 B1 | 1/2002 | Le et al. |
| 6,356,918 B1 | 3/2002 | Chuang et al. |
| 6,381,676 B2 | 4/2002 | Aglietti et al. |
| 6,418,513 B1 | 7/2002 | Arimilli et al. |
| 6,425,073 B2 | 7/2002 | Roussel et al. |
| 6,463,524 B1 | 10/2002 | Delaney et al. |
| 6,487,578 B2 | 11/2002 | Ranganathan |
| 6,549,930 B1 | 4/2003 | Chrysos et al. |
| 6,564,315 B1 | 5/2003 | Keller et al. |
| 6,654,876 B1 | 11/2003 | Le et al. |
| 6,728,866 B1 | 4/2004 | Kahle et al. |
| 6,732,236 B2 | 5/2004 | Favor |
| 6,839,828 B2 | 1/2005 | Gschwind et al. |
| 6,847,578 B2 | 1/2005 | Ayukawa et al. |
| 6,868,491 B1 | 3/2005 | Moore |
| 6,883,107 B2 | 4/2005 | Rodgers et al. |
| 6,944,744 B2 | 9/2005 | Ahmed et al. |
| 6,948,051 B2 | 9/2005 | Rivers et al. |
| 6,954,846 B2 | 10/2005 | Leibholz et al. |
| 6,978,459 B1 | 12/2005 | Dennis et al. |
| 7,020,763 B2 | 3/2006 | Saulsbury et al. |
| 7,024,543 B2 | 4/2006 | Grisenthwaite et al. |
| 7,086,053 B2 | 8/2006 | Long et al. |
| 7,093,105 B2 | 8/2006 | Webb, Jr. et al. |
| 7,100,028 B2 | 8/2006 | McGrath et al. |
| 7,114,163 B2 | 9/2006 | Hardin et al. |
| 7,124,160 B2 | 10/2006 | Saulsbury et al. |
| 7,155,600 B2 | 12/2006 | Burky et al. |
| 7,191,320 B2 | 3/2007 | Hooker et al. |
| 7,263,624 B2 | 8/2007 | Marchand et al. |
| 7,290,261 B2 | 10/2007 | Burky et al. |
| 7,302,527 B2 | 11/2007 | Barrick et al. |
| 7,350,056 B2 * | 3/2008 | Abernathy ............ G06F 9/3814 712/214 |
| 7,386,704 B2 | 6/2008 | Schulz et al. |
| 7,395,419 B1 | 7/2008 | Gonion |
| 7,398,374 B2 | 7/2008 | Delano |
| 7,401,188 B2 | 7/2008 | Matthews |
| 7,469,318 B2 | 12/2008 | Chung et al. |
| 7,478,198 B2 | 1/2009 | Latorre et al. |
| 7,478,225 B1 | 1/2009 | Brooks et al. |
| 7,490,220 B2 | 2/2009 | Balasubramonian et al. |
| 7,509,484 B1 | 3/2009 | Golla et al. |
| 7,512,724 B1 | 3/2009 | Dennis et al. |
| 7,565,652 B2 | 7/2009 | Janssen et al. |
| 7,600,096 B2 | 10/2009 | Parthasarathy et al. |
| 7,669,035 B2 | 2/2010 | Young et al. |
| 7,669,036 B2 | 2/2010 | Brown et al. |
| 7,685,410 B2 | 3/2010 | Shen et al. |
| 7,694,112 B2 | 4/2010 | Barowski et al. |
| 7,707,390 B2 | 4/2010 | Ozer et al. |
| 7,721,069 B2 | 5/2010 | Ramchandran et al. |
| 7,793,278 B2 | 9/2010 | Du et al. |
| 7,836,317 B2 | 11/2010 | Marchand et al. |
| 7,889,204 B2 | 2/2011 | Hansen et al. |
| 7,890,735 B2 | 2/2011 | Tran |
| 7,926,023 B2 | 4/2011 | Okawa et al. |
| 7,949,859 B2 | 5/2011 | Kalla et al. |
| 7,975,134 B2 | 7/2011 | Gonion |
| 7,987,344 B2 | 7/2011 | Hansen et al. |
| 8,046,566 B2 | 10/2011 | Abernathy et al. |
| 8,074,224 B1 | 12/2011 | Nordquist et al. |
| 8,099,556 B2 | 1/2012 | Ghosh et al. |
| 8,103,852 B2 | 1/2012 | Bishop et al. |
| 8,108,656 B2 | 1/2012 | Katragadda et al. |
| 8,131,942 B2 | 3/2012 | Harris et al. |
| 8,131,980 B2 | 3/2012 | Hall et al. |
| 8,135,942 B2 | 3/2012 | Abernathy et al. |
| 8,140,832 B2 | 3/2012 | Mejdrich et al. |
| 8,141,088 B2 | 3/2012 | Morishita et al. |
| 8,151,012 B2 * | 4/2012 | Kim ................. G11C 11/4082 710/15 |
| 8,166,282 B2 | 4/2012 | Madriles et al. |
| 8,184,686 B2 | 5/2012 | Wall et al. |
| 8,219,783 B2 | 7/2012 | Hara |
| 8,219,787 B2 | 7/2012 | Lien et al. |
| 8,243,866 B2 | 8/2012 | Huang et al. |
| 8,250,341 B2 | 8/2012 | Schulz et al. |
| 8,271,765 B2 | 9/2012 | Bose et al. |
| 8,325,793 B2 | 12/2012 | Zhong |
| 8,335,892 B1 | 12/2012 | Minkin et al. |
| 8,386,751 B2 | 2/2013 | Ramchandran et al. |
| 8,402,256 B2 | 3/2013 | Arakawa |
| 8,412,914 B2 | 4/2013 | Gonion |
| 8,464,025 B2 | 6/2013 | Yamaguchi et al. |
| 8,489,791 B2 | 7/2013 | Byrne et al. |
| 8,521,992 B2 | 8/2013 | Alexander et al. |
| 8,555,039 B2 | 10/2013 | Rychlik |
| 8,654,884 B2 | 2/2014 | Kerr |
| 8,656,401 B2 | 2/2014 | Venkataramanan et al. |
| 8,683,182 B2 | 3/2014 | Hansen et al. |
| 8,713,263 B2 | 4/2014 | Bryant |
| 8,793,435 B1 * | 7/2014 | Ashcraft ................ G06F 12/10 711/118 |
| 8,850,121 B1 | 9/2014 | Ashcraft et al. |
| 8,929,496 B2 | 1/2015 | Lee et al. |
| 8,935,513 B2 | 1/2015 | Guthrie et al. |
| 8,966,232 B2 | 2/2015 | Tran |
| 8,984,264 B2 | 3/2015 | Karlsson et al. |
| 9,069,563 B2 | 6/2015 | Konigsburg et al. |
| 9,207,995 B2 | 12/2015 | Boersma et al. |
| 9,223,709 B1 | 12/2015 | O'Bleness et al. |
| 9,519,484 B1 | 12/2016 | Stark |
| 9,665,372 B2 | 5/2017 | Eisen et al. |
| 9,672,043 B2 | 6/2017 | Eisen et al. |
| 9,690,585 B2 | 6/2017 | Eisen et al. |
| 9,690,586 B2 | 6/2017 | Eisen et al. |
| 9,720,696 B2 | 8/2017 | Chu et al. |
| 9,740,486 B2 | 8/2017 | Boersma et al. |
| 9,760,375 B2 | 9/2017 | Boersma et al. |
| 2002/0078302 A1 | 6/2002 | Favor |
| 2002/0194251 A1 | 12/2002 | Richter et al. |
| 2003/0120882 A1 | 6/2003 | Granston et al. |
| 2003/0163669 A1 | 8/2003 | Delano |
| 2003/0182537 A1 | 9/2003 | Le et al. |
| 2004/0111594 A1 | 6/2004 | Feiste et al. |
| 2004/0162966 A1 | 8/2004 | Webb, Jr. et al. |
| 2004/0172521 A1 | 9/2004 | Hooker et al. |
| 2004/0181652 A1 | 9/2004 | Ahmed et al. |
| 2004/0216101 A1 | 10/2004 | Burky et al. |
| 2005/0060518 A1 | 3/2005 | Augsburg et al. |
| 2005/0138290 A1 | 6/2005 | Hammarlund et al. |
| 2006/0095710 A1 | 5/2006 | Pires Dos Reis Moreira et al. |
| 2006/0106923 A1 | 5/2006 | Balasubramonian et al. |
| 2007/0022277 A1 | 1/2007 | Iwamura et al. |
| 2007/0079303 A1 | 4/2007 | Du et al. |
| 2007/0101102 A1 | 5/2007 | Dierks, Jr. et al. |
| 2007/0180221 A1 | 8/2007 | Abernathy et al. |
| 2007/0204137 A1 | 8/2007 | Tran |
| 2008/0098260 A1 | 4/2008 | Okawa et al. |
| 2008/0104375 A1 | 5/2008 | Hansen et al. |
| 2008/0133885 A1 | 6/2008 | Glew |

(56) References Cited

U.S. PATENT DOCUMENTS

| | | | |
|---|---|---|---|
| 2008/0162889 A1* | 7/2008 | Cascaval | G06F 9/3834 712/216 |
| 2008/0162895 A1 | 7/2008 | Luick | |
| 2008/0270749 A1 | 10/2008 | Ozer et al. | |
| 2008/0307182 A1 | 12/2008 | Arimilli et al. | |
| 2008/0313424 A1 | 12/2008 | Gschwind | |
| 2009/0037698 A1 | 2/2009 | Nguyen | |
| 2009/0113182 A1 | 4/2009 | Abernathy et al. | |
| 2009/0198921 A1 | 8/2009 | Chen et al. | |
| 2009/0265532 A1 | 10/2009 | Caprioli et al. | |
| 2009/0300319 A1 | 12/2009 | Cohen et al. | |
| 2010/0100685 A1 | 4/2010 | Kurosawa et al. | |
| 2010/0161945 A1 | 6/2010 | Burky et al. | |
| 2010/0191940 A1 | 7/2010 | Mejdrich et al. | |
| 2012/0066482 A1 | 3/2012 | Gonion | |
| 2012/0110271 A1 | 5/2012 | Boersma et al. | |
| 2012/0246450 A1 | 9/2012 | Abdallah | |
| 2013/0305022 A1 | 11/2013 | Eisen et al. | |
| 2014/0025933 A1 | 1/2014 | Venkataramanan et al. | |
| 2014/0075159 A1 | 3/2014 | Frigo et al. | |
| 2014/0215189 A1 | 7/2014 | Airaud et al. | |
| 2014/0223144 A1 | 8/2014 | Heil et al. | |
| 2014/0244239 A1 | 8/2014 | Nicholson et al. | |
| 2014/0281408 A1 | 9/2014 | Zeng | |
| 2015/0046662 A1 | 2/2015 | Heinrich et al. | |
| 2015/0121010 A1 | 4/2015 | Kaplan et al. | |
| 2015/0121046 A1 | 4/2015 | Kunjan et al. | |
| 2015/0134935 A1 | 5/2015 | Blasco | |
| 2015/0199272 A1 | 7/2015 | Goel et al. | |
| 2015/0324204 A1 | 11/2015 | Eisen et al. | |
| 2015/0324205 A1 | 11/2015 | Eisen et al. | |
| 2015/0324206 A1 | 11/2015 | Eisen et al. | |
| 2015/0324207 A1 | 11/2015 | Eisen et al. | |
| 2016/0070571 A1 | 3/2016 | Boersma et al. | |
| 2016/0070574 A1 | 3/2016 | Boersma et al. | |
| 2016/0092231 A1 | 3/2016 | Chu et al. | |
| 2016/0092276 A1 | 3/2016 | Chu et al. | |
| 2016/0103715 A1 | 4/2016 | Sethia et al. | |
| 2016/0202986 A1 | 7/2016 | Ayub et al. | |
| 2016/0202988 A1 | 7/2016 | Ayub et al. | |
| 2016/0202989 A1 | 7/2016 | Eisen et al. | |
| 2016/0202990 A1 | 7/2016 | Brownscheidle et al. | |
| 2016/0202991 A1 | 7/2016 | Eisen et al. | |
| 2016/0202992 A1 | 7/2016 | Brownscheidle et al. | |
| 2017/0168837 A1 | 6/2017 | Eisen et al. | |
| 2017/0255465 A1 | 9/2017 | Chadha et al. | |
| 2017/0277542 A1 | 9/2017 | Fernsler et al. | |
| 2017/0277543 A1 | 9/2017 | McGlone et al. | |
| 2017/0300328 A1 | 10/2017 | Cordes et al. | |
| 2017/0329641 A1 | 11/2017 | Chadha et al. | |
| 2017/0329713 A1 | 11/2017 | Chadha et al. | |
| 2017/0351521 A1 | 12/2017 | Hrusecky | |
| 2017/0357507 A1 | 12/2017 | Cordes et al. | |
| 2017/0357508 A1 | 12/2017 | Cordes et al. | |

FOREIGN PATENT DOCUMENTS

| | | | |
|---|---|---|---|
| CN | 101876892 A | 11/2010 | |
| CN | 102004719 A | 4/2011 | |
| EP | 1 212 680 B1 | 7/2007 | |
| GB | 2356324 A | 5/2001 | |
| GB | 2356324 B | 10/2001 | |
| JP | 2009157887 A | 7/2009 | |
| WO | WO 2015/067118 A1 | 5/2015 | |

OTHER PUBLICATIONS

Anonymous, "Method and System for Predicting Performance Trade-Offs During Critical Path Execution in a Processor", IP.com Prior Art Database Technical Disclosure No. 000223340 (online), Nov. 2012, 7 pages, URL: http://ip.com/IPCOM/000223340.

IBM, "Using a mask to block the wakeup of dependents of already-issued instructions", An IP.com Prior Art Database Technical Disclosure (online), IP.com No. 000193322, URL: http://ip.com/IPCOM/000193322, dated Feb. 18, 2010, 2 pages.

Anonymous, "Fast wakeup of load dependent instructions by a select bypass", An IP.com Prior Art Database Technical Disclosure (online), IP.com No. 000216900, URL: http://ip.com/IPCOM/000216900, dated Apr. 23, 2012, 2 pages.

Kalla, et al., "IBM Power5 Chip: A Dual-Core Multithreaded Processor", IEEE Micro, vol. 24, No. 2, Mar. 2004, pp. 40-47, IEEE Xplore Digital Library (online), DOI: 10.1109/MM.2004.1289290.

Sha et al., "Scalable Store-Load Forwarding via Store Queue Index Prediction", Proceedings of the 38th Annual IEEE/ACM International Symposium on Microarchitecture (MICRO'05), dated Nov. 2005, 12 pages, http://repository.upenn.edu/cis_papers/262 (online), ISBN: 0-7695-2440-0; DOI: 10.1109/MICRO.2005.29, IEEE Computer Society, Washington, DC.

Appendix P; List of IBM Patent or Applications Treated as Related, Sep. 23, 2016, 2 pages.

Roth, *Store Vulnerability Window (SVW): Re-Execution Filtering for Enhanced Load/Store Optimization*, Technical Reports (CIS), Paper 35, Jan. 2004, 23 pages, University of Pennsylvania Scholarly Commons (online), <https://repository.upenn.edu/cgi/viewcontent.cgi?referer=https://www.google.com/&httpsredir=1&article=1023&context=cis_reports>.

Bobba et al., *Safe and Efficient Supervised Memory Systems*, 17th International Symposium on High Performance Computer Architecture (HPCA), Feb. 2011, 12 pages, IEEE xPlore Digital Library (online; IEEE.org), DOI: 10.1109/HPCA.2011.5749744.

Mathis et al., "Characterization of simultaneous multithreading (SMT) efficiency in Powers", IBM Journal of Research and Development, Jul. 2005, pp. 555-564, vol. 49, No. 4/5, International Business Machines Corporation, Armonk, NY.

U.S. Appl. No. 15/152,257, to Sundeep Chadha et al., entitled, *Operation of a Multi-Slice Processor Implementing A Load/Store Unit Maintaining Rejected Instructions*, assigned to International Business Machines Corporation, 37 pages, filed May 11, 2016.

U.S. Appl. No. 15/180,838, to Robert A. Cordes et al., entitled, *Operation of a Multi-Slice Processor Implementing Simultaneous Two-Target Loads and Stores*, assigned to International Business Machines Corporation, 37 pages, filed Jun. 13, 2016.

U.S. Appl. No. 15/230,532, to Sundeep Chadha et al., entitled, *Flush Avoidance in a Load Store Unit*, assigned to International Business Machines Corporation, 37 pages, filed Aug. 8, 2016.

U.S. Appl. No. 15/219,638, to Robert A. Cordes et al., entitled, *Operation of a Multi-Slice Processor Implementing Simultaneous Two-Target Loads and Stores*, assigned to International Business Machines Corporation, 37 pages, filed Jul. 26, 2016.

U.S. Appl. No. 15/221,035, to Sundeep Chadha et al., entitled, *Operation of a Multi-Slice Processor Implementation A Load/Store Unite Maintaining Rejected Instructions*, assigned to International Business Machines Corporation, 37 pages, filed Jul. 27, 2016.

Gebhart et al., *A Hierarchical Thread Scheduler and Register File for Energy-efficient Throughput Processors*, ACM Transactions on Computer Systems, Apr. 2012, pp. 8:1-8:38, vol. 30, No. 2, Article 8, ACM New York.

Anonymous, *Method and system for Implementing "Register Threads" in a Simultaneously-Multithreaded (SMT) Processor Core*, An IP.com Prior Art Database Technical Disclosure, IP.com No. IPCOM000199825D IP.com Electronic Publication: Sep. 17, 2010 pp. 1-4 <http://ip.com/IPCOM/000199825>.

Czajkowski et al., *Resource Management for Extensible Internet Servers*, Proceedings of the 8 ACM SIGOPS European Workshop on Support for Composing Distributed Applications Sep. 1998 pp. 33-39 ACM Portugal.

Bridges et al., *A CPU Utilization Limit for Massively Parallel MIMD Computers*, Fourth Symposium on the Frontiers of Massively Parallel Computing Oct. 19-21, 1992 pp. 83-92 IEEE VA US.

Pechanek et al., *ManArray Processor Interconnection Network: An Introduction*, Euro-Par' 99 Parallel Processing, Lecture Notes in Computer Science, 5th International Euro-Par Conference, Aug. 31-Sep. 3, 1999, Proceedings, pp. 761-65, vol. 1685, Spring Berlin Heidelberg, Toulouse, France.

(56) References Cited

OTHER PUBLICATIONS

Pechanek et al., *The ManArray Embedded Processor Architecture*, Proceedings of the 26 Euromicro Conference, IEEE Computer Society, Sep. 5-7, 2000, pp. 348-55, vol. 1, Maastricht.

Anonymous, *Precise Merging Translation Queue in a Slice-Based Processor*, An IP.com Prior Art Database Technical Disclosure, IP.com No. IPCOM000249317D IP.com Electronic Publication: Feb. 16, 2017, pp. 1-3. <https://priorart.ip.com/IPCOM/000249317 >.

International Search Report and Written Opinion, PCT/IB2015/052741, dated Oct. 9, 2015.

\* cited by examiner

MANAGING A DIVIDED LOAD REORDER QUEUE

BACKGROUND

Field of the Invention

The field of the invention is data processing, or, more specifically, methods, apparatus, and products for managing a divided load reorder queue.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

One area of computer system technology that has advanced is computer processors. As the number of computer systems in data centers and the number of mobile computing devices has increased, the need for more efficient computer processors has also increased. Speed of operation and power consumption are just two areas of computer processor technology that affect efficiency of computer processors.

SUMMARY

Methods and apparatus for managing a divided load reorder queue (LRQ) are disclosed in this specification. Managing a divided LRQ includes storing load instruction data for a load instruction in an expanded LRQ entry in the LRQ; launching the load instruction from the expanded LRQ entry; determining that the load instruction is in a finished state; moving a subset of the load instruction data from the expanded LRQ entry to a compact LRQ entry in the LRQ, wherein the compact LRQ entry is smaller than the expanded LRQ entry; and removing the load instruction data from the expanded LRQ entry.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
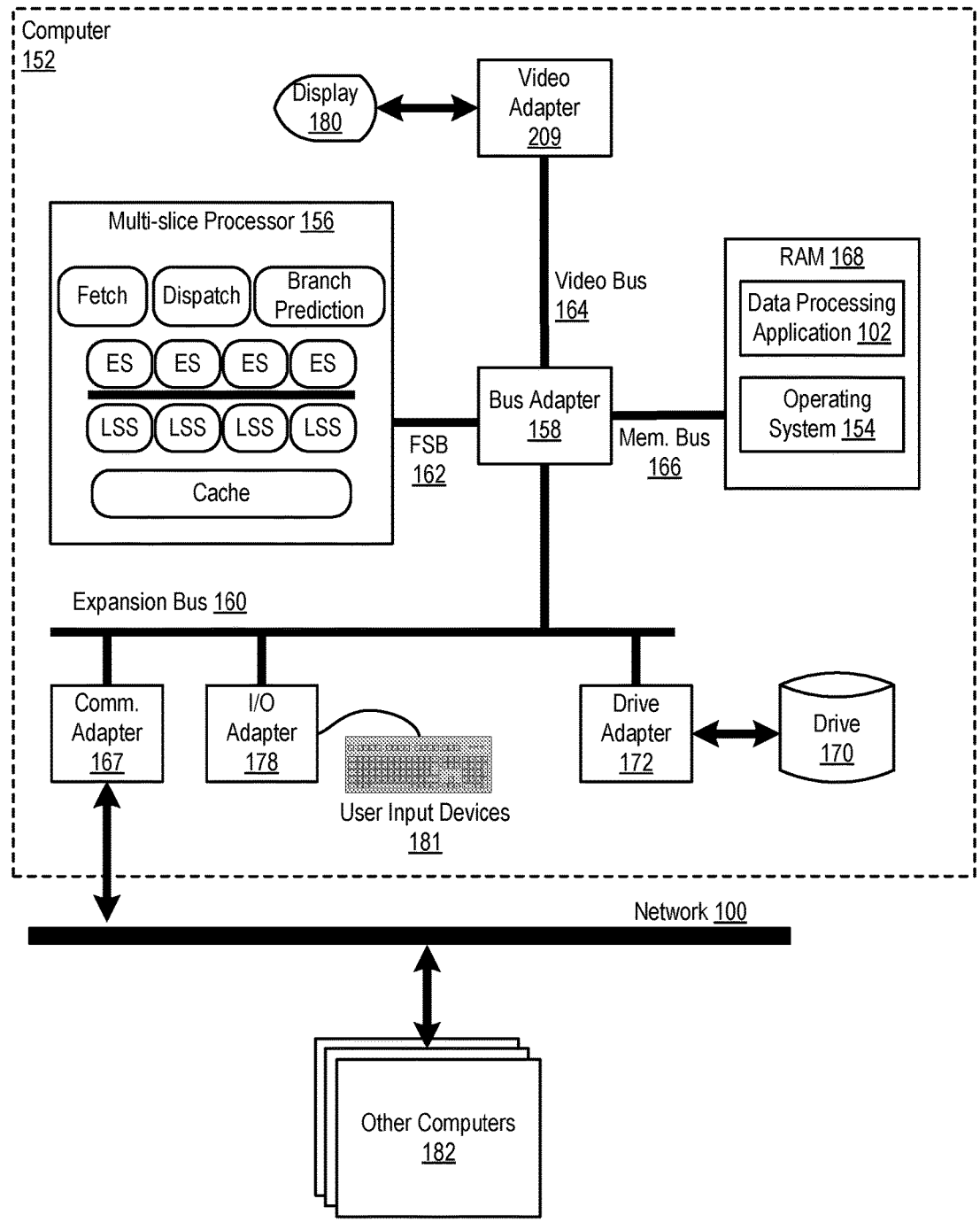
FIG. 1 sets forth a block diagram of an example system configured for managing a divided load reorder queue (LRQ) according to embodiments of the present invention.

Exemplary methods and apparatus for managing a divided load reorder queue (LRQ) in accordance with the present invention are described with reference to the accompanying drawings, beginning with FIG. 1. FIG. 1 sets forth a block diagram of an example system configured managing a divided LRQ according to embodiments of the present invention. The system of FIG. 1 includes an example of automated computing machinery in the form of a computer (152).

The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

The example computer processor (156) of FIG. 1 may be implemented as a multi-slice processor. The term 'multi-slice' as used in this specification refers to a processor having a plurality of similar or identical sets of components, where each set may operate independently of all the other sets or in concert with the one or more of the other sets. The multi-slice processor (156) of FIG. 1, for example, includes several execution slices ('ES') and several load/store slices ('LSS')—where load/store slices may generally be referred to as load/store units. Each execution slice may be configured to provide components that support execution of instructions: an issue queue, general purpose registers, a history buffer, an arithmetic logic unit (including a vector scalar unit, a floating point unit, and others), and the like. Each of the load/store slices may be configured with components that support data movement operations such as loading of data from cache or memory or storing data in cache or memory. In some embodiments, each of the load/store slices includes a data cache. The load/store slices are coupled to the execution slices through a results bus. In some embodiments, each execution slice may be associated with a single load/store slice to form a single processor slice. In some embodiments, multiple processor slices may be configured to operate together.

The example multi-slice processor (156) of FIG. 1 may also include, in addition to the execution and load/store slices, other processor components. In the system of FIG. 1, the multi-slice processor (156) includes fetch logic, dispatch logic, and branch prediction logic. Further, although in some embodiments each load/store slice includes cache memory, the multi-slice processor (156) may also include cache accessible by any or all of the processor slices.

Although the multi-slice processor (156) in the example of FIG. 1 is shown to be coupled to RAM (168) through a front side bus (162), a bus adapter (158) and a high speed memory bus (166), readers of skill in the art will recognize that such configuration is only an example implementation. In fact, the multi-slice processor (156) may be coupled to other components of a computer system in a variety of configurations. For example, the multi-slice processor (156) in some embodiments may include a memory controller configured for direct coupling to a memory bus (166). In some embodiments, the multi-slice processor (156) may support direct peripheral connections, such as PCIe connections and the like.

Stored in RAM (168) in the example computer (152) is a data processing application (102), a module of computer program instructions that when executed by the multi-slice processor (156) may provide any number of data processing tasks. Examples of such data processing applications may include a word processing application, a spreadsheet application, a database management application, a media library application, a web server application, and so on as will occur to readers of skill in the art. Also stored in RAM (168) is an operating system (154). Operating systems useful in computers configured for operation of a multi-slice processor according to embodiments of the present invention include UNIX™, Linux™, Microsoft Windows™, AIX™, IBM's z/OS™, and others as will occur to those of skill in the art. The operating system (154) and data processing application (102) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers configured for operation of a multi-slice processor according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for operation of a multi-slice processor according to embodiments of the present invention include modems for wired dial-up communications, Ethernet (IEEE 802.3) adapters for wired data communications, and 802.11 adapters for wireless data communications.

The arrangement of computers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
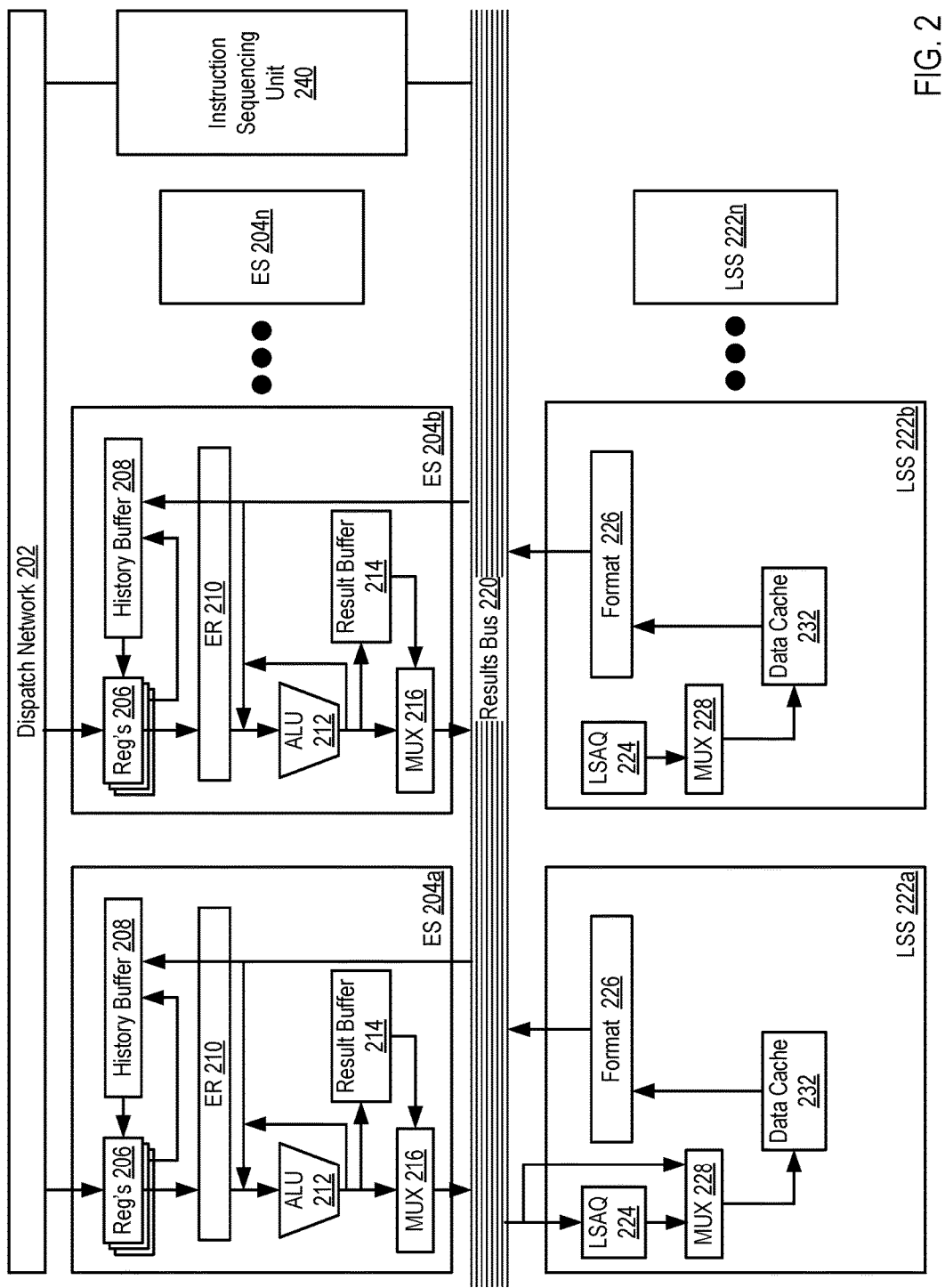
FIG. 2 sets forth a block diagram of a portion of a multi-slice processor according to embodiments of the present invention.

For further explanation, FIG. 2 sets forth a block diagram of a portion of a multi-slice processor according to embodiments of the present invention. The multi-slice processor in the example of FIG. 2 includes a dispatch network (202). The dispatch network (202) includes logic configured to dispatch instructions for execution among execution slices.

The multi-slice processor in the example of FIG. 2 also includes a number of execution slices (204a, 204b-204n). Each execution slice includes general purpose registers (206) and a history buffer (208). The general purpose registers and history buffer may sometimes be referred to as the mapping facility, as the registers are utilized for register renaming and support logical registers.

The general purpose registers (206) are configured to store the youngest instruction targeting a particular logical register and the result of the execution of the instruction. A logical register is an abstraction of a physical register that enables out-of-order execution of instructions that target the same physical register.

When a younger instruction targeting the same particular logical register is received, the entry in the general purpose register is moved to the history buffer, and the entry in the general purpose register is replaced by the younger instruction. The history buffer (208) may be configured to store many instructions targeting the same logical register. That is, the general purpose register is generally configured to store a single, youngest instruction for each logical register while the history buffer may store many, non-youngest instructions for each logical register.

Each execution slice (204) of the multi-slice processor of FIG. 2 also includes an execution reservation station (210). The execution reservation station (210) may be configured to issue instructions for execution. The execution reservation station (210) may include an issue queue. The issue queue may include an entry for each operand of an instruction. The execution reservation station may issue the operands for execution by an arithmetic logic unit or to a load/store slice (222a, 222b, 222c) via the results bus (220).

The arithmetic logic unit (212) depicted in the example of FIG. 2 may be composed of many components, such as add logic, multiply logic, floating point units, vector/scalar units, and so on. Once an arithmetic logic unit executes an operand, the result of the execution may be stored in the result buffer (214) or provided on the results bus (220) through a multiplexer (216).

The results bus (220) may be configured in a variety of manners and be of composed in a variety of sizes. In some instances, each execution slice may be configured to provide results on a single bus line of the results bus (220). In a similar manner, each load/store slice may be configured to provide results on a single bus line of the results bus (220). In such a configuration, a multi-slice processor with four processor slices may have a results bus with eight bus lines—four bus lines assigned to each of the four load/store slices and four bus lines assigned to each of the four execution slices. Each of the execution slices may be configured to snoop results on any of the bus lines of the results bus. In some embodiments, any instruction may be dispatched to a particular execution unit and then by issued to any other slice for performance. As such, any of the execution slices may be coupled to all of the bus lines to receive results from any other slice. Further, each load/store slice may be coupled to each bus line in order to receive an issue load/store instruction from any of the execution slices. Readers of skill in the art will recognize that many different configurations of the results bus may be implemented.

The multi-slice processor in the example of FIG. 2 also includes a number of load/store slices (222a, 222b-222n). Each load/store slice includes a queue (224), a multiplexer (228), a data cache (232), and formatting logic (226), among other components described below with regard to FIG. 3. The queue receives load and store operations to be carried out by the load/store slice (222). The formatting logic (226) formats data into a form that may be returned on the results bus (220) to an execution slice as a result of a load or store instruction.

The example multi-slice processor of FIG. 2 may be configured for flush and recovery operations. A flush and recovery operation is an operation in which the registers (general purpose register and history buffer) of the multi-slice processor are effectively 'rolled back' to a previous state. The term 'restore' and 'recover' may be used, as context requires in this specification, as synonyms. Flush and recovery operations may be carried out for many reasons, including missed branch predictions, exceptions, and the like. Consider, as an example of a typical flush and recovery operation, that a dispatcher of the multi-slice processor dispatches over time and in the following order: an instruction A targeting logical register 5, an instruction B targeting logical register 5, and an instruction C targeting logical register 5. At the time instruction A is dispatched, the instruction parameters are stored in the general purpose register entry for logical register 5. Then, when instruction B is dispatched, instruction A is evicted to the history buffer (all instruction parameters are copied to the history buffer, including the logical register and the identification of instruction B as the evictor of instruction A), and the parameters of instruction B are stored in the general purpose register entry for logical register 5. When instruction C is dispatched, instruction B is evicted to the history buffer and the parameters of instruction C are stored in the general purpose register entry for logical register 5. Consider, now, that a flush and recovery operation of the registers is issued in which the dispatch issues a flush identifier matching the identifier of instruction C. In such an example, flush and recovery includes discarding the parameters of instruction C in the general purpose register entry for logical register 5 and moving the parameters of instruction B from the history buffer for instruction B back into the entry of general purpose register for logical register 5.

During the flush and recovery operation, in prior art processors, the dispatcher was configured to halt dispatch of new instructions to an execution slice. Such instructions may be considered either target or source instructions. A target instruction is an instruction that targets a logical register for storage of result data. A source instruction by contrast has, as its source, a logical register. A target instruction, when executed, will result in data stored in an entry of a register file while a source instruction utilizes such data as a source for executing the instruction. A source instruction, while utilizing one logical register as its source, may also target another logical register for storage of the results of instruction. That is, with respect to one logical register, an instruction may be considered a source instruction and with respect to another logical register, the same instruction may be considered a target instruction.

The multi-slice processor in the example of FIG. 2 also includes an instruction sequencing unit (240). While depicted as a single unit, each of the plurality of execution slices may include a respective instruction sequencing unit similar to instruction sequencing unit (240). Instruction sequencing unit (240) may take dispatched instructions and check dependencies of the instructions to determine whether all older instructions with respect to a current instruction have delivered, or may predictably soon deliver, results of these older instructions from which the current instruction is dependent so that the current instruction may execute correctly. If all dependencies to a current instruction are satisfied, then a current instruction may be determined to be ready to issue, and may consequently be issued—regardless of a program order of instructions as determined by an ITAG. Such issuance of instructions may be referred to as an "out-of-order" execution, and the multi-slice processor may be considered an out-of-order machine.

In some cases, a load/store unit receiving an issued instruction, such as a load/store slice, may not yet be able to handle the instruction, and the instruction sequencing unit (240) may keep the instruction queued until such time as the load/store slice may handle the instruction. After the instruction is issued, the instruction sequencing unit (240) may track progress of the instruction based at least in part on signals received from a load/store slice.

Figure 3:
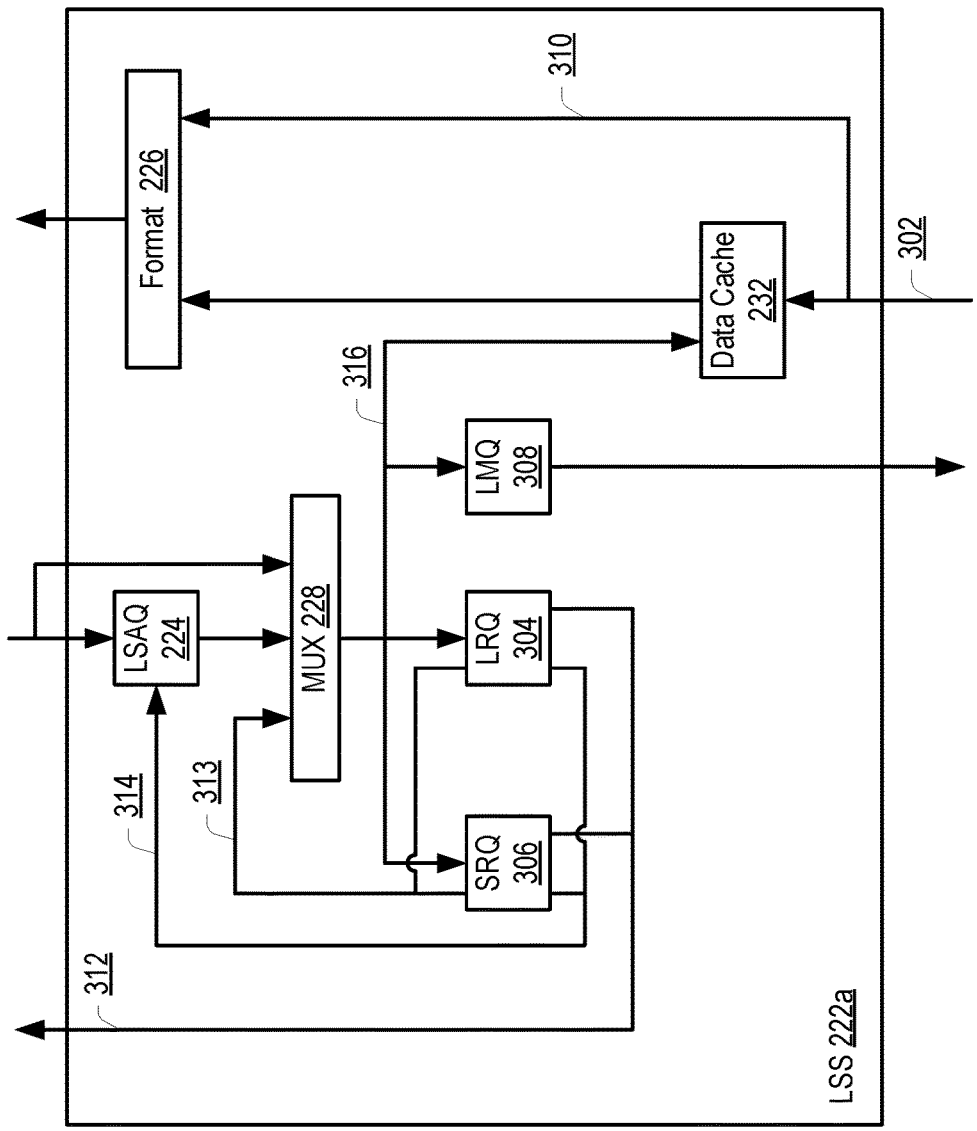
FIG. 3 sets forth a block diagram of a portion of a load/store slice of a multi-slice processor according to embodiments of the present invention.

For further explanation, FIG. 3 sets forth a block diagram depicting an expanded view of a load/store slice (222a) implementing architectural components that include a load/store access queue (LSAQ) (224), a load reorder queue (LRQ) (304), a load miss queue (LMQ) (308), a store reorder queue (SRQ) (306), a data cache (232), among other components. The load/store access queue (224) may propagate an instruction through MUX (228) along line (316) to the load reorder queue (304) or the store reorder queue (306).

In previous systems, if a load/store unit received an instruction from an instruction sequencing unit, and the load/store unit was unable to handle the instruction for some reason, then the load/store unit would notify the instruction sequencing unit that the instruction was being rejected and the load/store unit would discard information related to the rejected instruction. In which case, the instruction sequencing unit would continue maintaining information to track and maintain the rejected instruction until the instruction is resent to the load/store unit. An instruction may be rejected for a variety of reasons, including an address miss in an address translation cache, a set prediction miss, data cache banking collisions, an overload of the load miss queue (308), among other possible rejection conditions.

The load/store slice (222a), by contrast to the above previous system, is configured to determine a rejection condition for an instruction received from an instruction sequencing unit, however, the load/store slice (222a), instead of sending a reject signal to the instruction sequencing unit, maintains tracking and handling of the instruction—including information usable to relaunch or reissue the instruction—until the rejection condition is resolved. Further, an entry in the load reorder queue (304) or the store reorder queue (306) may be configured to maintain information for tracking an instruction that would otherwise have been rejected and removed from the load reorder queue (304). For example, if the load/store slice (222a) determines that a rejection condition exists for a given load or store instruction, then logic within the load/store slice may notify the load reorder queue (304) or the store reorder queue (306) to place the instruction in a sleep state for a given number of cycles, or to place the instruction in a sleep state until notified to awaken, or to immediately reissue the instruction, among other notifications to perform other operations.

In this way, the load/store slice (222a) may save cycles that would otherwise be lost if the instruction were rejected to the instruction sequencing unit because the load/store slice (222a) may more efficiently and quickly reissue the instruction when the rejection condition is resolved in addition to more quickly detecting resolution of a rejection condition than an instruction sequencing unit. For example, if the load/store slice (222a) determines that an instruction that is in a sleep state may be reissued in response to determining that one or more rejection conditions have been resolved preventing the instruction from completing, then the load/store store slice may notify the load reorder queue (304) or the store reorder queue (306) to relaunch or reissue the instruction immediately or after some number of cycles. The number of cycles may depend upon a type of rejection condition or upon other factors affecting reissue or relaunch of the instruction. In this example, the load reorder queue (304) or the store reorder queue (306) may reissue or relaunch an instruction by providing the load/store access queue (224) with information to reissue the instruction, where the load reorder queue (304) or the store reorder queue (306) may communicate with the load/store access queue (224) along line (314) and may provide data for reissuing or relaunching the instruction along line (313).

Another improvement that results from the load/store slice (222a) maintaining an instruction if a rejection condition is determined is that the load/store slice (222a) uses fewer resources, such as logic and circuitry for latches and other components, to maintain the instruction than an instruction sequencing unit. In other words, given that the instruction sequencing unit may rely on the load/store slice (222a) in handling the instruction to completion, the instruction sequencing unit may free resources once the instruction is provided to the load/store slice (222a).

Further, the instruction sequencing unit (240), based at least in part on communications with the load/store slice (222a), may determine when and whether to wake instructions that may be dependent on a current instruction being handled by the load/store slice (222a). Therefore, if the load/store slice (222a) determines that a rejection condition exists, the load/store slice (222a) delays a notification to the instruction sequencing unit (240) to awaken dependent instructions to prevent the instruction sequencing unit (240) from issuing dependent instructions that are subsequently unable to finish due to lack of availability of results from a current instruction. In this way, the instruction sequencing unit (240) may avoid wasting execution cycles reissuing dependent instructions that are unable to finish.

For example, the load/store slice (222a) may communicate with the instruction sequencing unit (240) through the generation of signals indicating, at different points in handling a load instruction, that a load instruction is to be reissued or that data for a load instruction is valid. In some cases, in response to the instruction sequencing unit (240) receiving a signal from the load/store slice (222a) that a given instruction is to be reissued, the instruction sequencing unit (240) may awaken instructions dependent upon the given instruction with the expectation that the given instruction, after being reissued, is going to finish and provide valid data.

The load/store slice (222a) may also retrieve data from any tier of a memory hierarchy, beginning with a local data cache (232), and extending as far down in the hierarchy as needed to find requested data. The requested data, when received, may be provided to general purpose registers, virtual registers, or to some other destination. The received data may also be stored in a data cache (232) for subsequent access. The load/store slice (222a) may also manage translations of effective addresses to real addresses to communicate with different levels of memory hierarchy.

A store reorder queue (306) may include entries for tracking the cache operations for sequential consistency and may reissue operations into the load/store pipeline for execution independent of an execution slice.

A load miss queue (308) may issue requests for data to one or more data storage devices of a multi-tiered memory hierarchy, where a request for data may correspond to a load instruction for the data.

Responsive to the data being returned along the line (302) to the load/store slice (222a), the data may be delivered to a destination such as the results bus (220 of FIG. 2) to be loaded into, for example, a general purpose register—where the delivery of the data may be from the data cache (232) or over the line (310). The line (310) bypasses the data cache (232) and allows implementation of a critical data forwarding path. The load reorder queue (304) may also use line (312) to notify an instruction sequencing unit, or some other logical component, that the data is available.

A load reorder queue (304) may track execution of cache operations issued to the load/store slice (222a) and includes entries for tracking cache operations for sequential consistency, among other attributes. The load reorder queue (304) may also reissue operations into the load/store pipeline for execution, which provides operation that is independent of the execution slices.

Figure 4:
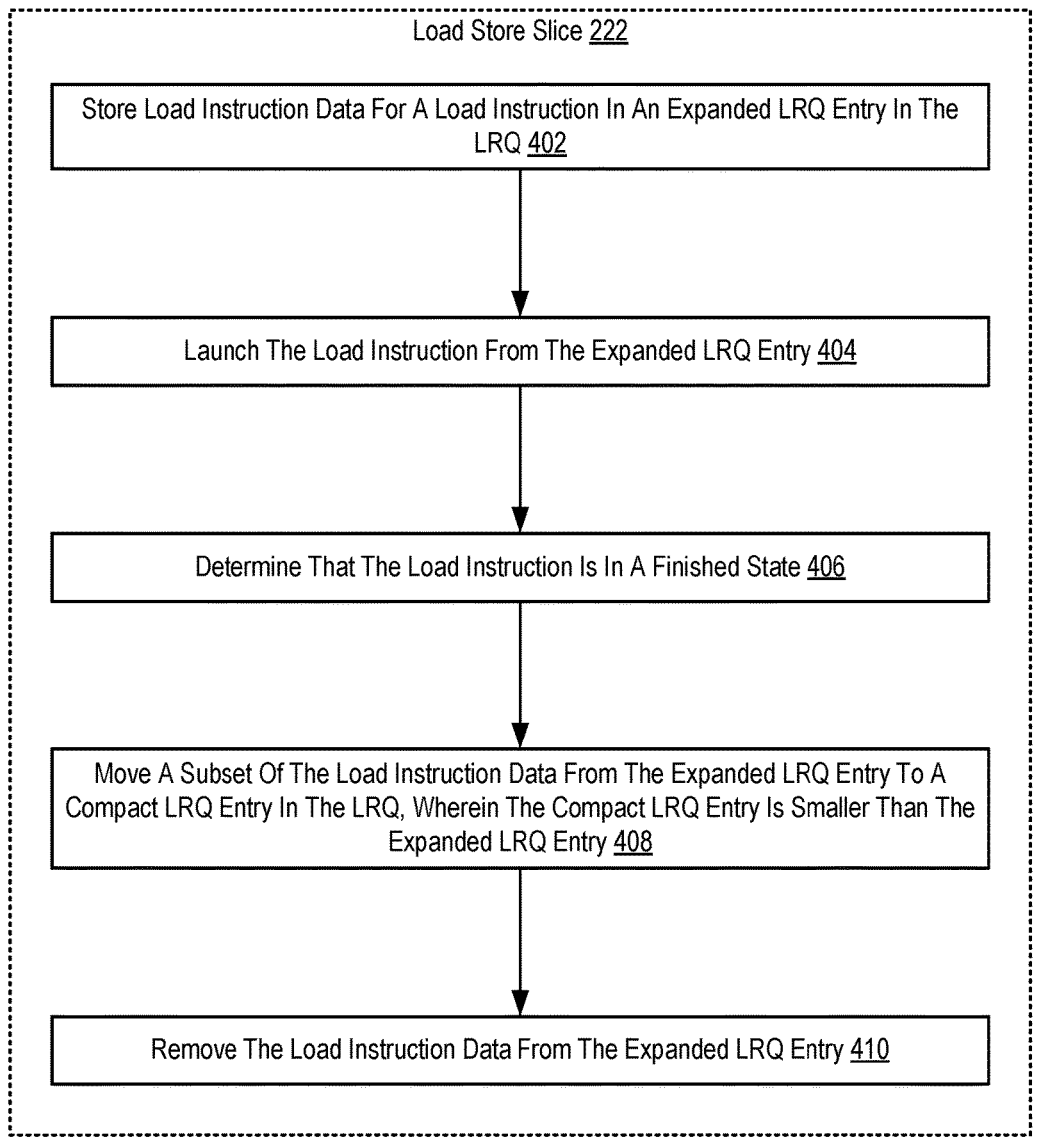
FIG. 4 sets forth a flow chart illustrating an exemplary method for managing a divided LRQ according to embodiments of the present invention.

For further explanation, FIG. 4 sets forth a flow chart illustrating an exemplary method for managing a divided LRQ. The method of FIG. 4 may be carried out by a multi-slice processor similar to that in the examples of FIGS. 1-3. Such a multi-slice processor may include an instruction sequencing unit (240), and a plurality of load/store slices (222a-222n), where each of the load/store slices may implement a load/store access queue (224), a load reorder queue (304), and a store reorder queue (306), as described above with regard to FIG. 3.

The method of FIG. 4 includes storing (402) load instruction data for a load instruction in an expanded LRQ entry in the LRQ (304). Storing (402) load instruction data for a load instruction in an expanded LRQ entry in the LRQ (304) may be carried out by the instruction sequencing unit (240) issuing the load instruction to the LSS (222), and the LSS (222) storing the load instruction data in the expanded LRQ entry in the LRQ (304).

The LRQ (304) may be divided in that the LRQ (304) may include at least two entries that are different sizes. The divided LRQ (304) may include one set (i.e., a plurality) of entries that are one size (e.g., 300 bits), and one set (i.e., a plurality) of entries that are another size (e.g., 50 bits). The larger entries may be referred to as expanded LRQ entries, and the smaller entries may be referred to as compact LRQ entries. The divided LRQ (304) may include one or a plurality of expanded LRQ entries and one or a plurality of compact LRQ entries.

An expanded LRQ entry may be configured to store load instruction data about a load instruction. A load instruction is an instruction that reads data from memory (such as data cache (232) and stores that data in a register. The load instruction may be an internal operation decoded from a processor instruction.

The load instruction data may include the load instruction and other data describing the load instruction. The load instruction data stored in the expanded LRQ entry may include instruction operation codes, effective address information to determine the bytes within a cacheline that are involved in the load, an instruction identifier (e.g., an ITAG), a real address that describes the cacheline address used by lower levels of memory hierarchy, an associated LMQ (308) entry, and state of the load instruction for relaunch. After the load instruction is issued and stored in the expanded LRQ entry, but before the load instruction has finished, information in the load instruction data is used by the LSS (222) for launching the load instruction.

The method of FIG. 4 includes launching (404) the load instruction from the expanded LRQ entry. Launching (404) the load instruction from the expanded LRQ entry may be carried out by initiating the load process described by the load instruction and the load instruction data. Launching (404) the load instruction from the expanded LRQ entry may include other processing performed in service of the load instruction, such as address fetches, data cache lookups, and data fetches. Launching the load instruction may also include relaunching the load instruction (e.g., in the event that incorrect data was read from the data cache (232) during the initial or a previous launch).

The method of FIG. 4 includes determining (406) that the load instruction is in a finished state. Determining (406) that the load instruction is in a finished state may be carried out by determining that an indication has been received that the load instruction has successfully been executed (e.g., data targeted by the load instruction has been placed in a register). Specifically, determining (406) that the load instruction is in a finished state may be carried out by determining that a load instruction is in the finished state based on a pipeline stage of the load instruction. Once the cycle associated with the load instruction finish has concluded, and the LSS (222) receives valid bits associated with that cycle, the LSS (222) may determine that the load instruction has entered the finish state. The determination that the load instruction is in a finished state may be made at any point during the finish state of the load instruction.

The finished state may describe the state of a load instruction after the load instruction has finished (i.e., an indication has been received that the load instruction has successfully been executed) but before the load instruction has completed (i.e., an indication has been received that the load instruction data is no longer needed). A finished state is a state of the load instruction during which a large portion of the information in the load instruction data is no longer used. Specifically, the finished state indicates that the load instruction will no longer need to be relaunched and the load instruction will no longer need to fetch data from memory (such as the level 2 cache). The finished state may further indicate that data associated with the execution of the load instruction has been sent to the instruction sequencing unit (240), but the load instruction may still be out-of-order.

The method of FIG. 4 includes moving (408) a subset of the load instruction data from the expanded LRQ entry to a compact LRQ entry in the LRQ (304), wherein the compact LRQ entry is smaller than the expanded LRQ entry. Moving (408) a subset of the load instruction data from the expanded LRQ entry to a compact LRQ entry in the LRQ (304), wherein the compact LRQ entry is smaller than the expanded LRQ entry may be carried out in response to a determination that the load instruction is in a finished state. Further, moving (408) a subset of the load instruction data from the expanded LRQ entry to a compact LRQ entry in the LRQ (304), wherein the compact LRQ entry is smaller than the expanded LRQ entry may be carried out by determining that at least one compact LRQ entry is available to store the subset of the load instruction data; moving the load instruction data from the expanded LRQ entry to a staging area; extracting the subset of the load instruction data from the load instruction data; and storing the extracted subset of the load instruction data in the compact LRQ entry in the LRQ (304).

The subset of the load instruction data is the portion of the load instruction data that includes some, but not all, of the information in the load instruction data. The subset of the load instruction data may include only the necessary information to perform one or more tasks. For example, the subset of the load instruction data may include information for maintaining load ordering, such as a real address, age information (e.g., using an instruction identifier or ITAG), byte flags, and snoop information.

Further, the information in the subset of the load instruction data may be stored in an altered form. For example, a hash of one or more portions, fields, or elements of the subset of the load instruction data may be stored instead of the full portion, field or element. For example, a hash of the real address may be stored in the compact LRQ entry instead of the full real address. Using a hash of the information may conserve space within the compact LRQ entry.

The method of FIG. 4 includes removing (410) the load instruction data from the expanded LRQ entry. Removing (410) the load instruction data from the expanded LRQ entry may be carried out by setting a flag within an element of the expanded LRQ entry indicating that the expanded LRQ entry is no longer valid, and is free for storage of the load instruction data of another load instruction.

Figure 5:
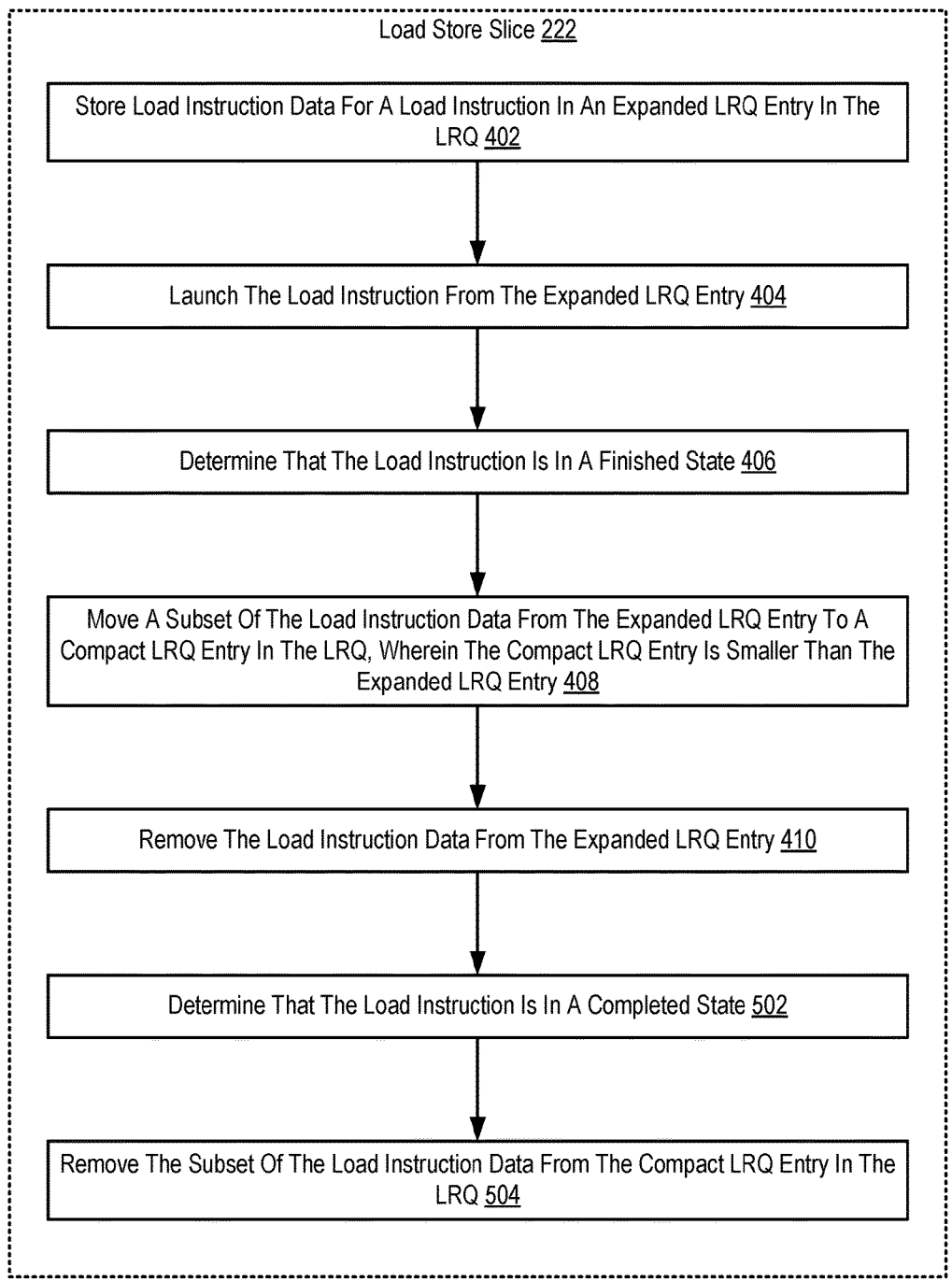
FIG. 5 sets forth a flow chart illustrating an exemplary method for managing a divided LRQ according to embodiments of the present invention.

For further explanation, FIG. 5 sets forth a flow chart illustrating an exemplary method for managing a divided LRQ according to embodiments of the present invention that includes storing (402) load instruction data for a load instruction in an expanded LRQ entry in the LRQ (304); launching (404) the load instruction from the expanded LRQ entry; determining (406) that the load instruction is in a finished state; moving (408) a subset of the load instruction data from the expanded LRQ entry to a compact LRQ entry in the LRQ (304), wherein the compact LRQ entry is smaller than the expanded LRQ entry; and removing (410) the load instruction data from the expanded LRQ entry.

The method of FIG. 5 differs from the method of FIG. 4, however, in that the method of FIG. 5 further includes determining (502) that the load instruction is in a completed state; and removing (504) the subset of the load instruction data from the compact LRQ entry in the LRQ (304). Determining (502) that the load instruction is in a completed state may be carried out by determining that a load instruction is in the completed state based receiving an indication that the load instruction data for the load instruction is no longer needed. Such an indication may be sent by the instruction sequencing unit (240), and received by the LRQ (304). The indication may include a completion valid flag and an identifier (e.g., an ITAG) of the completed instruction. The completed instruction may be the last sequential instruction that has completed, indicating all older instructions have also completed.

The completed state may describe the state of a load instruction after the load instruction has completed (i.e., an indication has been received that the load instruction data is no longer needed). A completed state is a state of the load instruction during which none of the load instruction data is needed by any other element in the system. Specifically, the completed state indicates that the load instruction data is no longer needed to determine the order of other instructions.

Removing (504) the subset of the load instruction data from the compact LRQ entry in the LRQ (304) may be carried out by comparing the identifier of the completed instruction received from the instruction sequencing unit (240) to the identifier for each load instruction stored in the LRQ (304). This may include both expanded LRQ entries and compact LRQ entries. If the identifier for the load instruction is less than (or equal to) the completed instruction identifier, then the load instruction data is removed from the LRQ entry. Removing (504) the subset of the load instruction data from the compact LRQ entry in the LRQ (304) may also be carried out by setting a flag within an element of the compact LRQ entry indicating that the compact LRQ entry is no longer valid, and is free for storage of a subset of load instruction data of another load instruction.

Figure 6:
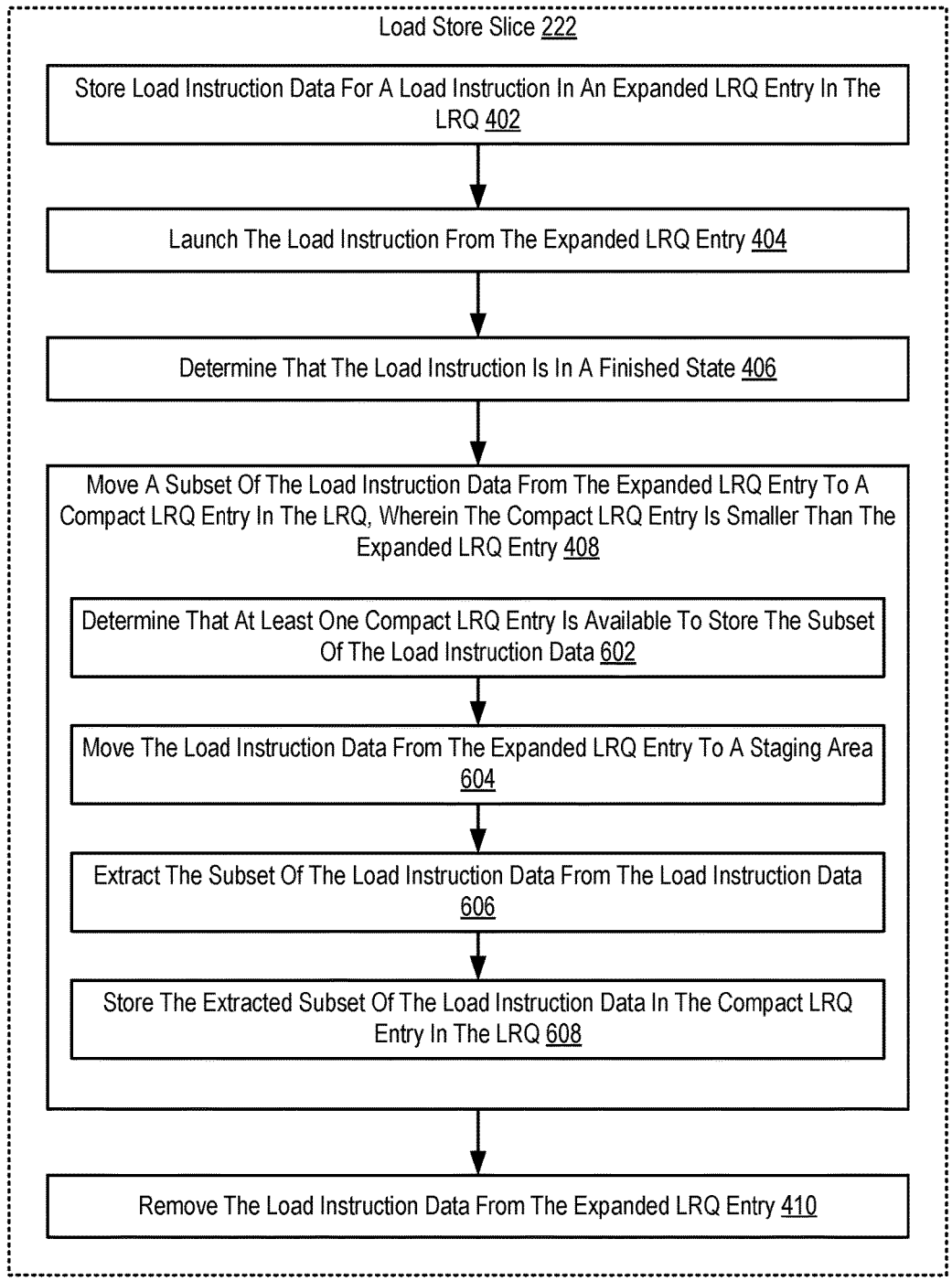
FIG. 6 sets forth a flow chart illustrating an exemplary method for managing a divided LRQ according to embodiments of the present invention.

For further explanation, FIG. 6 sets forth a flow chart illustrating an exemplary method for managing a divided LRQ according to embodiments of the present invention that includes storing (402) load instruction data for a load instruction in an expanded LRQ entry in the LRQ (304); launching (404) the load instruction from the expanded LRQ entry; determining (406) that the load instruction is in a finished state; moving (408) a subset of the load instruction data from the expanded LRQ entry to a compact LRQ entry in the LRQ (304), wherein the compact LRQ entry is smaller than the expanded LRQ entry; and removing (410) the load instruction data from the expanded LRQ entry.

The method of FIG. 6 differs from the method of FIG. 4, however, in that moving (408) a subset of the load instruction data from the expanded LRQ entry to a compact LRQ entry in the LRQ (304), wherein the compact LRQ entry is smaller than the expanded LRQ entry includes determining (602) that at least one compact LRQ entry is available to store the subset of the load instruction data; moving (604) the load instruction data from the expanded LRQ entry to a staging area; extracting (606) the subset of the load instruction data from the load instruction data; and storing (608) the extracted subset of the load instruction data in the compact LRQ entry in the LRQ (304).

Determining (602) that at least one compact LRQ entry is available to store the subset of the load instruction data may be carried out by traversing each compact LRQ entry and reading a valid bit for each compact LRQ entry. Determining (602) that at least one compact LRQ entry is available to store the subset of the load instruction data may further be carried out by determining the entry identifier of one compact LRQ entry that does not have a valid bit set indicating that new load instruction data (or more specifically, a subset of load instruction data) may be stored in that compact LRQ entry.

Moving (604) the load instruction data from the expanded LRQ entry to a staging area may be carried out by transferring the load instruction data (or a subset of the load instruction data) from the expanded LRQ entry to a staging area. The staging area may be a data storage location configured to store the load instruction data or a subset of the load instruction data. The staging area may be a special purpose register, a location in memory, or a special entry in the LRQ (304).

Extracting (606) the subset of the load instruction data from the load instruction data may be carried out by selecting one or more portions, fields, or elements from the load instruction data for storage in the compact LRQ entry. Extracting (606) the subset of the load instruction data from the load instruction data may also be carried out by modifying a portion, field, or element of the load instruction data. For example, a hash may be taken of one or more portions, fields, or elements of the load instruction data (e.g. hashing the real address), and the hash of the one or more portions, fields, or elements may be stored as a part of the subset of the load instruction data.

Extracting (606) the subset of the load instruction data from the load instruction data may be performed prior to, or concurrently with, moving the load instruction data to the staging area or storing the extracted subset of the load instruction in the compact LRQ entry. For example, a portion of the load instruction data may be moved from the expanded LRQ entry or from the staging area and the remaining portion not within the subset of load instruction data may remain in the expanded LRQ entry or staging area to be overwritten.

Storing (608) the extracted subset of the load instruction data in the compact LRQ entry in the LRQ (304) may be carried out by transferring the subset of the load instruction data from the staging area to the compact LRQ entry.

Exemplary embodiments of the present invention are described largely in the context of a fully functional computer system for managing a divided load reorder queue. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of managing a divided load reorder queue (LRQ), the method comprising:
   storing load instruction data for a load instruction in an expanded LRQ entry in the LRQ;
   launching the load instruction from the expanded LRQ entry;
   determining that the load instruction is in a finished state;

moving a subset of the load instruction data from the expanded LRQ entry to a compact LRQ entry in the LRQ, wherein the compact LRQ entry is smaller than the expanded LRQ entry; and removing the load instruction data from the expanded LRQ entry.

2. The method of claim 1, further comprising:
determining that the load instruction is in a completed state; and
removing the subset of the load instruction data from the compact LRQ entry in the LRQ.

3. The method of claim 1, wherein moving the subset of the load instruction data from the expanded LRQ entry to the compact LRQ entry in the LRQ comprises:
determining that at least one compact LRQ entry is available to store the subset of the load instruction data.

4. The method of claim 1, wherein moving the subset of the load instruction data from the expanded LRQ entry to the compact LRQ entry in the LRQ comprises:
moving the load instruction data from the expanded LRQ entry to a staging area;
extracting the subset of the load instruction data from the load instruction data; and
storing the extracted subset of the load instruction data in the compact LRQ entry in the LRQ.

5. The method of claim 1, wherein the expanded LRQ entry is one of a plurality of expanded LRQ entries in the LRQ, and wherein the compact LRQ entry is one of a plurality of compact LRQ entries in the LRQ.

6. The method of claim 1, wherein the subset of the load instruction data comprises a hash of a portion of the load instruction data.

7. The method of claim 1, wherein a size of the compact LRQ entry is less than half of a size of the expanded LRQ entry.

8. A multi-slice processor configured to carry out:
storing load instruction data for a load instruction in an expanded LRQ entry in the LRQ;
launching the load instruction from the expanded LRQ entry;
determining that the load instruction is in a finished state;
moving a subset of the load instruction data from the expanded LRQ entry to a compact LRQ entry in the LRQ, wherein the compact LRQ entry is smaller than the expanded LRQ entry; and
removing the load instruction data from the expanded LRQ entry.

9. The multi-slice processor of claim 8, further configured to carry out:
determining that the load instruction is in a completed state; and
removing the subset of the load instruction data from the compact LRQ entry in the LRQ.

10. The multi-slice processor of claim 8, wherein moving the subset of the load instruction data from the expanded LRQ entry to the compact LRQ entry in the LRQ comprises:
determining that at least one compact LRQ entry is available to store the subset of the load instruction data.

11. The multi-slice processor of claim 8, wherein moving the subset of the load instruction data from the expanded LRQ entry to the compact LRQ entry in the LRQ comprises:
moving the load instruction data from the expanded LRQ entry to a staging area;
extracting the subset of the load instruction data from the load instruction data; and
storing the extracted subset of the load instruction data in the compact LRQ entry in the LRQ.

12. The multi-slice processor of claim 8, wherein the expanded LRQ entry is one of a plurality of expanded LRQ entries in the LRQ, and wherein the compact LRQ entry is one of a plurality of compact LRQ entries in the LRQ.

13. The multi-slice processor of claim 8, wherein the subset of the load instruction data comprises a hash of a portion of the load instruction data.

14. The multi-slice processor of claim 8, wherein a size of the compact LRQ entry is less than half of a size of the expanded LRQ entry.

15. An apparatus comprising a multi-slice processor configured to carry out:
storing load instruction data for a load instruction in an expanded LRQ entry in the LRQ;
launching the load instruction from the expanded LRQ entry;
determining that the load instruction is in a finished state;
moving a subset of the load instruction data from the expanded LRQ entry to a compact LRQ entry in the LRQ, wherein the compact LRQ entry is smaller than the expanded LRQ entry; and
removing the load instruction data from the expanded LRQ entry.

16. The apparatus of claim 15, where in the multi-slice processor is further configured to carry out:
determining that the load instruction is in a completed state; and
removing the subset of the load instruction data from the compact LRQ entry in the LRQ.

17. The apparatus of claim 15, wherein moving the subset of the load instruction data from the expanded LRQ entry to the compact LRQ entry in the LRQ comprises:
determining that at least one compact LRQ entry is available to store the subset of the load instruction data.

18. The apparatus of claim 15, wherein moving the subset of the load instruction data from the expanded LRQ entry to the compact LRQ entry in the LRQ comprises:
moving the load instruction data from the expanded LRQ entry to a staging area;
extracting the subset of the load instruction data from the load instruction data; and
storing the extracted subset of the load instruction data in the compact LRQ entry in the LRQ.

19. The apparatus of claim 15, wherein the expanded LRQ entry is one of a plurality of expanded LRQ entries in the LRQ, and wherein the compact LRQ entry is one of a plurality of compact LRQ entries in the LRQ.

20. The apparatus of claim 15, wherein the subset of the load instruction data comprises a hash of a portion of the load instruction data.

\* \* \* \* \*